United States Patent [19]
Oguro et al.

[11] Patent Number: 5,991,686
[45] Date of Patent: Nov. 23, 1999

[54] VEHICLE ELECTRONIC CONTROL USING ONE A/D CONVERTER FOR TIME-SYNCHRONOUS AND TIME-ASYNCHRONOUS A/D CONVERTER

[75] Inventors: Hirokazu Oguro, Okazaki; Takayoshi Tamakoshi, Nagoya, both of Japan

[73] Assignee: Denso Corporation, Kariya, Japan

[21] Appl. No.: 09/104,975

[22] Filed: Jun. 26, 1998

[30] Foreign Application Priority Data

Jul. 30, 1997 [JP] Japan ................................ 9-204164

[51] Int. Cl.⁶ .......................... H03M 1/12; F02D 45/00
[52] U.S. Cl. ...................... 701/115; 341/141; 701/101; 701/102
[58] Field of Search ................. 701/115, 102, 701/101; 123/480; 341/141

[56] References Cited

U.S. PATENT DOCUMENTS

| | | |
|---|---|---|
| 4,264,898 | 4/1981 | Barman et al. ................ 341/141 |
| 4,945,486 | 7/1990 | Nitschke et al. ............... 701/114 |
| 5,541,601 | 7/1996 | Goto et al. .................... 341/141 |
| 5,812,880 | 9/1998 | Goto et al. .................... 710/37 |

FOREIGN PATENT DOCUMENTS 3-225054 of 0000 Japan.
9-146709 of 0000 Japan.

*Primary Examiner*—Willis R. Wolfe
*Assistant Examiner*—Hieu T. Vo
*Attorney, Agent, or Firm*—Nixon & Vanderhye P.C.

[57] ABSTRACT

Various sensor signals of an engine are A/D-converted by an A/D converter of a sub-microcomputer by an A/D conversion request from a main microcomputer. The A/D conversion is executed a plurality of times within one packet for important parameters in the various sensor signals in the A/D conversion request timing per constant time with a longer time interval than a time required for the A/D conversion by an A/D conversion request timing asynchronous to the A/D conversion request. Thereby, normal ones among a plurality of A/D-converted values A/D-converted by the A/D conversion request of the main microcomputer even if the preceding A/D conversion request is issued asynchronously to the A/D conversion request of the main microcomputer.

6 Claims, 6 Drawing Sheets

FIG. 4

| INDEX COUNTER | ch NO. | SENSOR SIGNALS | CONTENT |
|---|---|---|---|
| 0 | ch00 | VG | AIR FLOW |
| 1 | ch01 | VTA | THROTTLE OPENING |
| 2 | ch05 | VOX1 | OXYGEN |
| 3 | ch08 | IOCV | OCV CURRENT |
| 4 | ch09 | ION1 | ION CURRENT(#1) |
| 5 | ch10 | ION2 | ION CURRENT(#2) |
| 6 | ch11 | ION3 | ION CURRENT(#3) |
| 7 | ch12 | ION4 | ION CURRENT(#4) |
| 8 | ch00 | VG | AIR FLOW |
| 9 | ch01 | VTA | THROTTLE OPENING |
| 10 | ch05 | VOX1 | OXYGEN |
| 11 | ch08 | IOCV | OCV CURRENT |
| 12 | ch09 | ION1 | ION CURRENT(#1) |
| 13 | ch10 | ION2 | ION CURRENT(#2) |
| 14 | ch11 | ION3 | ION CURRENT(#3) |
| 15 | ch12 | ION4 | ION CURRENT(#4) |
| 16 | ch02 | THW | WATER TEMPERATURE |
| 17 | ch03 | THA | INTAKE TEMPERATURE |
| 18 | ch04 | +B/4 | POWER SOURCE VOLTAGE |
| 19 | ch06 | THAM | MANIFOLD TEMPERATURE |
| 20 | ch07 | THO | OIL TEMPERATURE |
| 21 | ch13 | BATT | DISCONNEC. DETEC. SIGNAL |

VEHICLE ELECTRONIC CONTROL USING ONE A/D CONVERTER FOR TIME-SYNCHRONOUS AND TIME-ASYNCHRONOUS A/D CONVERTER

CROSS REFERENCE TO RELATED APPLICATION

This application relates to and incorporates herein by reference Japanese Patent Application No. 09-204164 filed on Jul. 30, 1997.

BACKGROUND OF THE INVENTION

1. Field of the Invention

The present invention relates to a vehicle electronic control method and system for controlling a vehicle by using A/D-converted values of detection signals from various sensors for controlling the vehicle.

2. Related Art

Among systems in which electronic fuel injection (EFI), electronic ignition spark advance (ESA) and the like are processed in one electronic control unit (ECU), there has been known one in which a sub-microcomputer for discriminating whether or not there occurs a knock is separately constructed from a main microcomputer for performing the other vehicular controls because signal processing for the knock control is complicated.

There has been also known in which an A/D converter for A/D-converting (analog to digital converting) sensor signals from various sensors is built in the sub-microcomputer and an A/D conversion request is output from the main microcomputer to the sub-microcomputer.

In order to simplify the process for outputting the A/D conversion request in the microcomputer, it is proposed to cause the A/D converter to output the A/D conversion request to a plurality of channels in batch (continuously) by a hardware circuit different from a CPU within the microcomputer just by instructing the A/D conversion request time-synchronously by the CPU, i.e., at every constant time interval.

However, when this is adopted to the system having the knock control, A/D conversion of a knock signal for controlling the knock may be activated in the sub-microcomputer during when the A/D converter in the sub-microcomputer side executes the A/D conversion requested by the main microcomputer. It is because the A/D conversion process of the knock signal has to be executed time-asynchronously, more specifically, at every angular rotation of a crankshaft of an internal combustion engine.

Here, if the A/D conversion process in the A/D converter of the sub-microcomputer requested by the main microcomputer overlaps with the A/D conversion process for the knock control via the A/D converter of the sub-microcomputer itself, either one of the A/D-converted values will be necessarily broken. As the A/D-conversion for the knock control is preceded in the sub-microcomputer due to its importance in the vehicular control and the time synchronous A/D-converted value will be sent to the main microcomputer in the state where it is broken.

The A/D-converted values produced by the time-synchronous A/D conversion process also corresponds to important parameters, e.g., a parameter for finding a variation per constant time. Data of such parameters must be taken in corresponding to the output timing of the A/D conversion request. Thus, there will occur a problem that the vehicular control is troubled when the A/D-converted value is broken.

SUMMARY OF THE INVENTION

The present has an object to provide a vehicle electronic control which can lessen an influence on vehicular controls even if a part of A/D-converted values of a plurality of detection signals which are A/D-converted time-synchronously is broken by a time-asynchronous A/D conversion.

According to a vehicular control system of the present invention, signals detected by a plurality of sensors are A/D converted time-synchronously by an A/D converter of a sub-microcomputer as requested by an A/D conversion request signal from a main microcomputer. At this time, specific signals among the plurality of signals are A/D-converted a plurality of times with a time interval longer than a time required for a time-asynchronous A/D conversion requested by a request signal of the sub-microcomputer. The A/D conversion requested by the request signal of the sub-microcomputer precedes the A/D conversion requested by the request signal of the main microcomputer, the A/D converter A/D-converts the sensor signals based on the request signal of the sub-microcomputer when the request signal of the sub-microcomputer is input to the A/D converter during when it is performing the A/D conversion requested by the request signal of the main microcomputer. At this time, although the A/D conversion data of the A/D-converted signals requested by the main microcomputer is broken, A/D conversion data of the requested and A/D-converted signals may be provided as for the specific signals because those are A/D-converted a plurality of times with the time interval longer than the time required for the A/D conversion requested by the request signal of the sub-microcomputer. Preferably, the signals which are A/D-converted a plurality of times here are signals for which a variation per every constant time should be calculated for a vehicular control.

BRIEF DESCRIPTION OF DRAWINGS

Other objects, features and advantages of the present invention will be understood more fully from the following detailed description made with reference to the accompanying drawings. In the drawings:

FIG. 4 is a table showing scheduling of ADch within one packet in the embodiment of the present invention;

DETAILED DESCRIPTION OF THE PREFERRED EMBODIMENT

Figure 1:
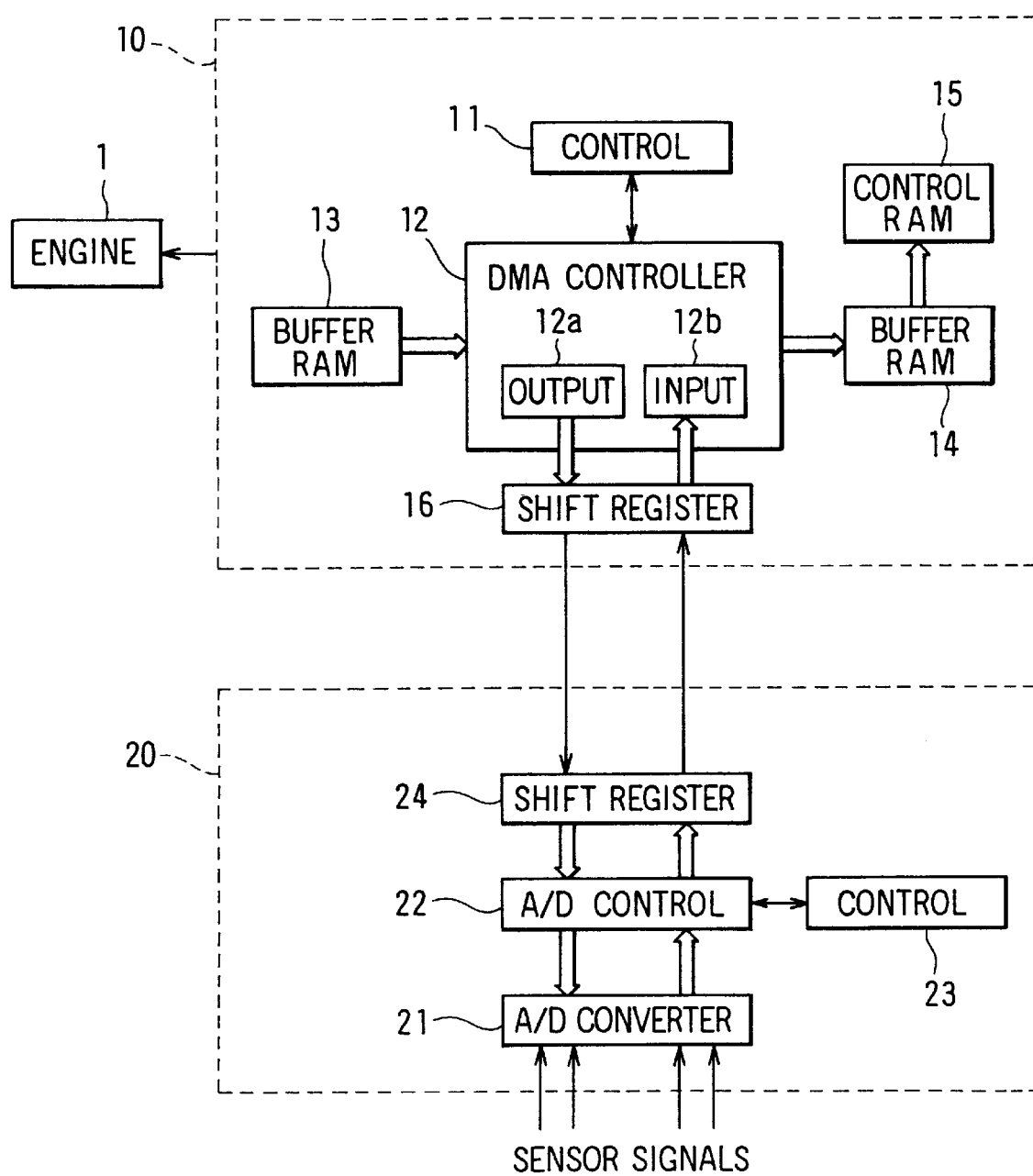
FIG. 1 is a block diagram showing a vehicular control system according to one embodiment of the present invention.

Referring first to FIG. 1 showing a vehicular control system, particularly an internal combustion engine control system, the control system uses two microcomputers, i.e., a main microcomputer 10 and a sub-microcomputer 20, for executing calculation operation for controlling an internal combustion engine 1.

The main microcomputer 10 comprises, generally, a CPU as a known central processing unit, a control section 11 composed of a logical operation circuit such as a ROM in which a control program is stored, a direct memory access (DMA) controller 12 which is activated as an A/D conversion command is specified from the control section 11, a buffer RAM 13 for scheduling channel numbers (ADch) for performing A/D conversion as described later and for storing them, a buffer RAM 14 for sequentially storing A/D-converted values, a control RAM 15 for storing the A/D-converted values which are determined to be normal as described later among those stored in the buffer RAM 14 to use for the control of the internal combustion engine 1 and a shift register 16 which is connected to an output section 12a and an input section 12b of the DMA controller 12.

The sub-microcomputer 20 comprises, generally, a shift register 24 which is connected with the shift register 16 of the main microcomputer 10 and to an A/D conversion control section 22 described later, an A/D converter 21 for A/D-converting various sensor signals as detection signals indicative of engine operating condition, the A/D conversion control section 22 for activating the A/D converter 21 by specifying ADch received by serial communication (serial out) via the shift register 24 and for transmitting A/D-converted values of the sensor signals A/D-converted by the A/D converter 21 to the shift register 16 of the main microcomputer 10 by serial communication (serial in) to the main microcomputer 10 via the shift register 24, a CPU as a central processing unit for controlling the serial communication between the A/D conversion control section 22 and the shift register 16 of the main microcomputer 10 and the transmission/receiving operation with the A/D converter 21 and a control section 23 composed of a logical operation circuit such as a ROM in which a control program is stored.

Figure 2:
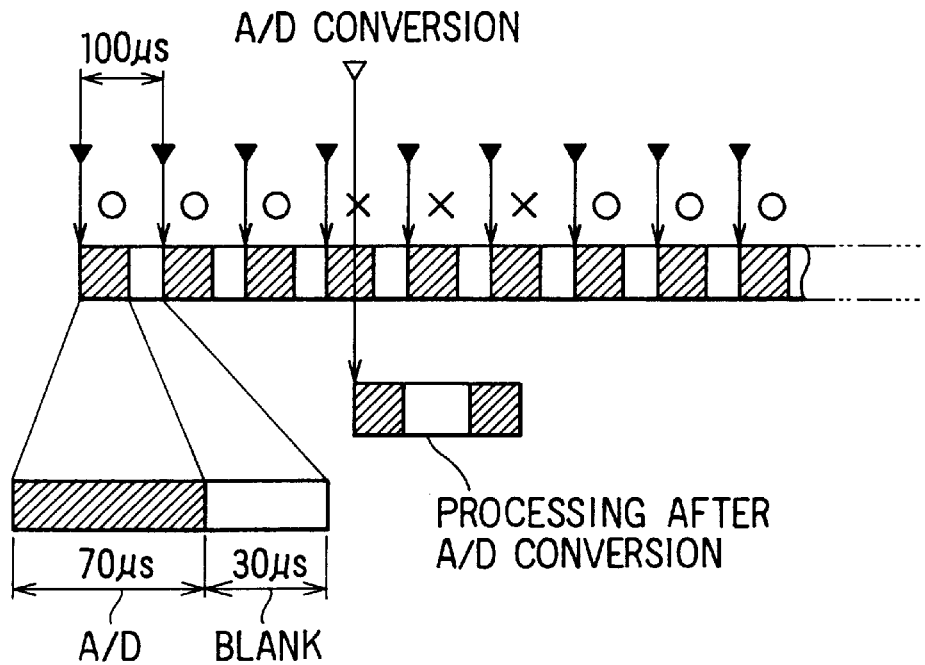
FIG. 2 is a diagram showing A/D conversion timing in the vehicular control system in the embodiment of the present invention.

A/D conversion timing in this embodiment is scheduled as shown in FIG. 2. Specifically, the A/D converter 21 built in the sub-microcomputer 20 is activated at every time-synchronized A/D conversion communication timing (▼) sent from the DMA controller 12 of the main microcomputer 10. Based on A/D conversion request signals output from the control section 11 of the main microcomputer 10 per every constant time (4 ms), the DMA controller 12 activates the A/D converter in the scheduled order per every 100 μs time-synchronously. Thereby, the A/D converter 21 performs A/D conversion in the scheduled order per every 100 μs in response to the A/D conversion communication timing sent from the DMA controller 12. This A/D conversion communication timing of every 100 μs is set by adding 30 μs of blank time to 70 μs of time required for each A/D conversion.

In FIG. 2, the A/D conversion is repeated up to three times as normally completed (○) with the A/D conversion communication timing of every 100 μs. Then, on the way of the fourth A/D conversion, A/D conversion (▽) to a knock signal from a knock sensor (not shown) disposed in the internal combustion engine as requested by an A/D conversion request of the sub-microcomputer 20 which is asynchronous to the A/D conversion request of every constant time from the main microcomputer 10, i.e., per 90° crank angle (CA) after the top dead center (ATDC) position of the internal combustion engine, is performed. Then, the time-synchronous A/D conversion of 3 ch from the fourth to sixth ones among ADch A/D-converted by the A/D conversion request of the main microcomputer 10 is not completed (×) and is broken due to the A/D conversion request within the sub-microcomputer 20 which is time-asynchronous and preceding to the time-synchronous A/D conversion request of every constant time from the main microcomputer 10. It is noted that the A/D conversion of the knock signal is executed twice in order to obtain A/D-converted values for a peak hold circuit and an integration circuit as described later. A time required for each time-asynchronous A/D conversion of the sub-microcomputer 20 corresponds to 3 ch of the A/D conversion activated per every 100 μs from the DMA controller 12.

Figure 3:
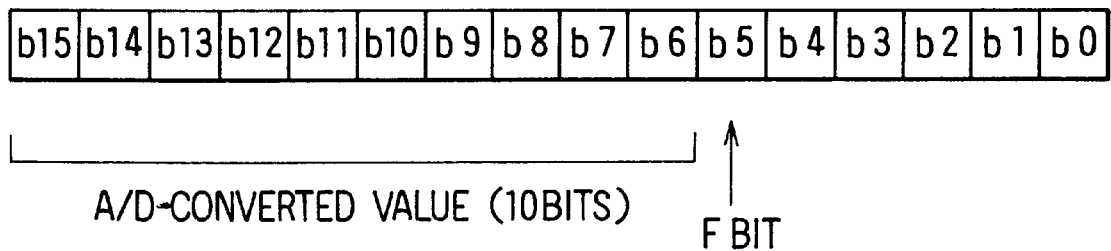
FIG. 3 is a diagram showing an A/D conversion data format used in the embodiment of the present invention.

Here, as shown in FIG. 3, an A/D conversion data format is composed of 16 bits from b15 to b0. 10 bits from the first b15 to b6 are used as the A/D-converted value and the next bit b5 is used as a flag bit F to discriminate whether the time-synchronous A/D conversion is normally completed or not completed. When this F bit is "1", it indicates that the time-synchronous A/D conversion has been normally completed and when the F bit is "0", it indicates that the time-synchronous A/D conversion has not been completed. It is noted that the remaining five bits from b4 to b0 are blank bits.

Next, one A/D conversion request from the main microcomputer 10, i.e., scheduling of ADch within one packet, will be explained with reference to FIG. 4. It is noted that an explanation of detailed contents of the sensor signals will be omitted here.

The respective ch Nos. and sensor signals corresponding to an order of index counters 0 through 21 are allocated in the buffer RAM 13 within the main microcomputer 10. The sensor signals of the respective ch Nos. corresponding to the index counters 0 through 7 are data which changes rapidly from time to time during engine operation. Those sensor signals are air flow signal, throttle opening signal, oxygen signal and ion current signals. Hence those are required to be subjected to a calculation of a variation per every constant time (short time) for the precise engine control. Thus, those are data necessary to be A/D-converted per every 4 ms. Here, the sensor signals of the respective ch Nos. corresponding to the index counters 0 through 7 are duplicated and scheduled to be subjected to the A/D conversion in correspondence with the index counters 8 through 15, respectively. Here, because the number of chs which will be broken when the A/D conversion request of the sub-microcomputer 20 asynchronous to the A/D conversion request requested by the main microcomputer 10 per every constant time overlaps is known as 3 channels, the sensor signals of the same ch No. duplicated and scheduled corresponding to the index counters are separated at least by a predetermined number of index counters. That is, as the time-asynchronous A/D conversion needs 300 μs (3 channels) in this embodiment, the channels for the A/D conversion of the same sensor signals are separated more than 3 channels, e.g., 8 channels in this embodiment.

Therefore, when it is determined that the data corresponding to the index counters 0 through 7 are broken, the main microcomputer 10 can use the recovery data in the index counters 8 through 15 without waiting next A/D conversion data to the A/D conversion request of the next time (after 4 ms) as described later. It is noted that a temporal change is relatively small as for other sensor signals such as water temperature, intake air temperature and the like. Therefore, those signals are allocated to the respective ch Nos. in the index counters 16 through 21. The A/D-converted values provide by the A/D conversion request of the previous time (4 ms before) are used when it is determined that the A/D-converted values of this time are broken.

Figure 5:
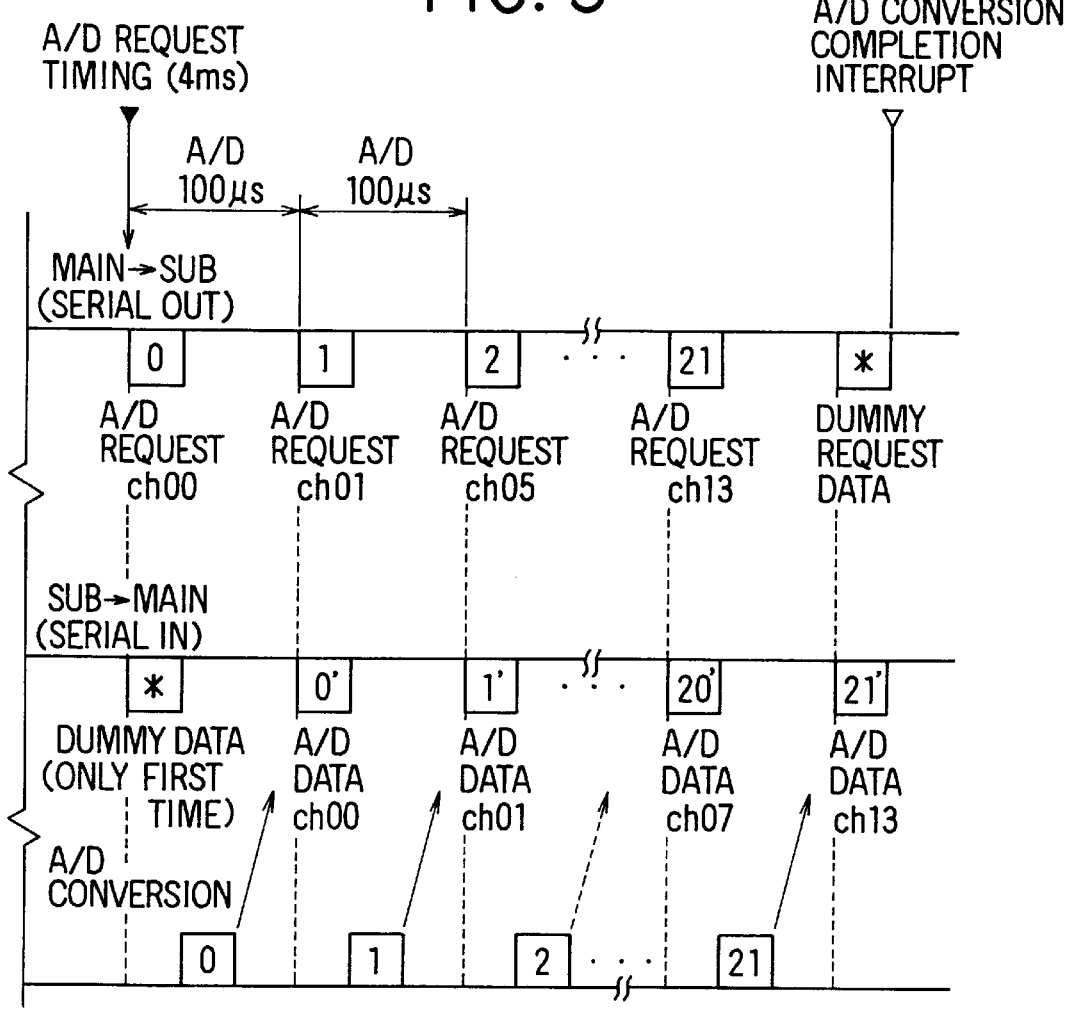
FIG. 5 is a timing chart showing communication states between a main microcomputer and a sub-microcomputer in the embodiment of the present invention.

Next, serial communication states between the main microcomputer 10 and the sub-microcomputer 20 in this embodiment is shown in FIG. 5.

The A/D conversion of every 100 $\mu$s to the sensor signals of the respective ch Nos. corresponding to the index counters 0 through 21 (numbers surrounded by □) is activated by the DMA controller 12 at the A/D conversion request timing (▼) of every 4 ms of the main microcomputer 10. At first, ch00 is serially output to the sub-microcomputer 20 as an A/D conversion request corresponding to the index counter 0 from the DMA controller 12 of the main microcomputer 10. At the same time, because there is not data to be provided by the sub-microcomputer 20 at the first time, dummy data (*) is serially input from the sub-microcomputer 20 to the main microcomputer 10. Thereby, an A/D conversion operation of the sensor signal corresponding to the ch00 is executed by the A/D converter 21 built in the sub-microcomputer 20 and an A/D-converted value which has been A/D-converted is transferred to the shift register 24 in the sub-microcomputer 20 as A/D conversion data (0') of the ch00 along with the F bit.

Next, as an A/D conversion request corresponding to the index counter 1, the ch01 is serially output from the main microcomputer 10 to the sub-microcomputer 20. At the same time, the A/D conversion data (0') of the ch00 is serially input from the shift register 24 in the sub-microcomputer 20 to the main microcomputer 10. Thus, the contents of the A/D conversion request from the main microcomputer 10 and the A/D conversion data A/D-converted in the sub-microcomputer 20 are serially communicated one after another in the handshaking mode.

Then, in order to receive A/D conversion data of the ch 21 in the end of the A/D conversion request from the main microcomputer 10 of this time, dummy data (*) is transmitted from the main microcomputer 10 to the sub-microcomputer 20. Then, the main microcomputer 10 receives the A/D conversion data of the ch21 from the sub-microcomputer 20, thus completing all of the data transmitting/receiving operations. After that, an A/D conversion completion interrupt (▽) is generated in the main microcomputer 10 and an A/D conversion completion interrupt process described later is executed by using the A/D-converted values stored within the buffer RAM 14.

Figure 6:
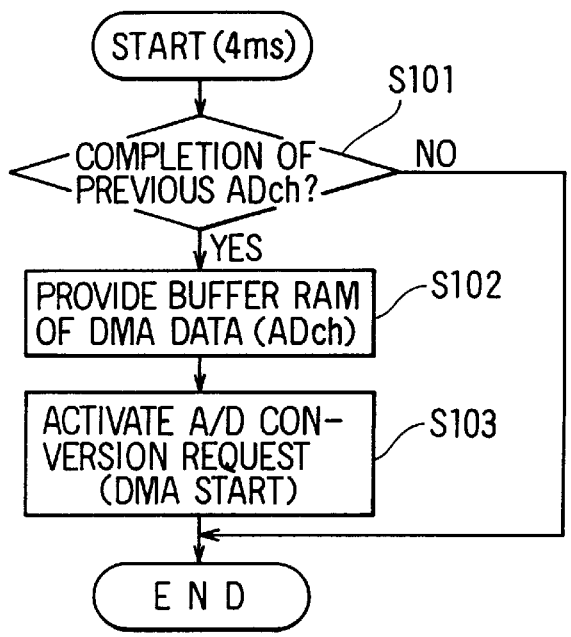
FIG. 6 is a flowchart showing a computer processing for activating an A/D conversion request in a control section of the main microcomputer used in the embodiment of the present invention.

The main microcomputer 10 is programmed to execute a processing for activating the A/D conversion request in the control section 11 as shown in FIG. 6. It is noted that this A/D conversion request activating routine is repeatedly executed in the control section 11 of the main microcomputer 10 per every 4 ms.

At first, it is determined in Step S101 whether or not the A/D conversion corresponding to ADch of the previous time has been completed. That is, it is checked whether the operation of the DMA controller 12 of 4 ms before has been completed. When the discriminating condition in Step S101 holds, that is, when it is determined that the A/D conversion by the DMA controller 12 has been completed (YES), the process advances to Step S102 to provide the buffer RAM 14 corresponding to DMA data (ADch) at this time in the DMA controller 12. Then, the process advances to Step S103 to activate the A/D conversion request to the A/D conversion data, i.e., to start the operation (start DMA) of the DMA controller 12, Then, this routine ends. When the discriminating condition in Step S101 does not hold, that is, when the A/D conversion corresponding to the previous ADch has not been completed (NO) on the other hand, this routine ends. When the DMA controller 12 is thus abnormal, an abnormal-time process may be executed.

Figure 7:
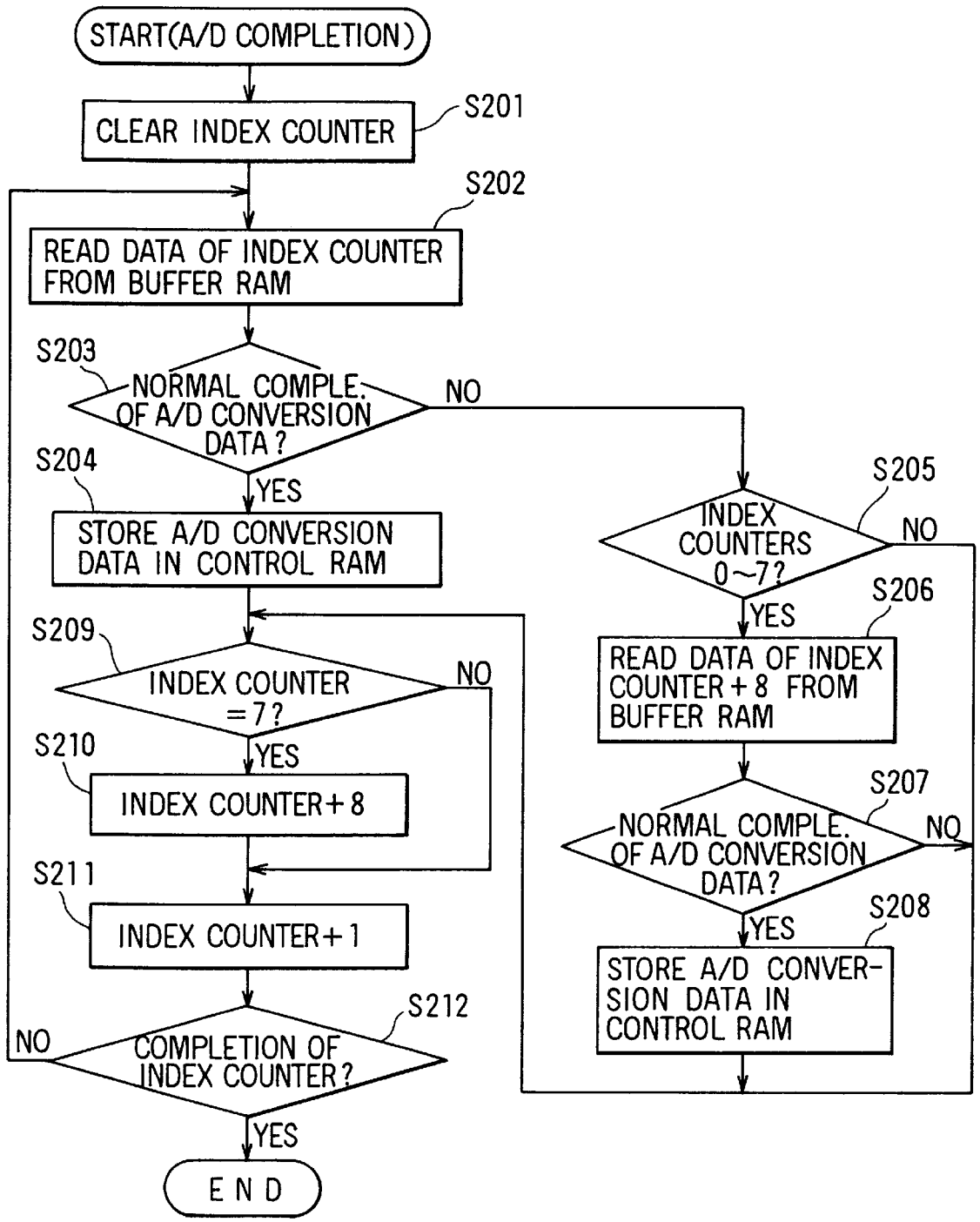
FIG. 7 is a flowchart showing a computer processing for interrupting completion of A/D conversion to A/D conversion data in the control section of the main microcomputer used in the embodiment of the present invention.

The main microcomputer 10 is further programmed to execute a processing of the A/D conversion completion interrupt to the A/D conversion data in the DMA controller 12 of the main microcomputer 10 as shown in FIG. 7. It is noted that this A/D conversion completion interrupt routine is repeatedly executed in the control section 11 of the main microcomputer 10 every time when the A/D conversion completion interrupt is generated.

At first, the index counter is cleared from "21" to "0" as an initial setting in Step S201. Next, the process advances to Step S202 to read data indicated by the index counter from the buffer RAM 14. Then, the process advances to Step S203 to discriminate whether or not the A/D conversion has been normally completed. Here, the A/D conversion data may be determined to be normally completed when the F bit within the A/D conversion data format shown in FIG. 3 is "1" and to be not completed when it is "0". Next, when the discriminating condition in Step S203 holds, that is, when it is determined that the data is normal A/D conversion data (YES), the process advances to Step S204 to store the A/D conversion data from the buffer RAM 14 to the control RAM 15.

When the discriminating condition in Step S203 does not hold, that is, the data is incomplete A/D conversion data (NO) on the other hand, the process advances to Step S205 to discriminate whether or not the index counters are "0" through "7" allocated to parameters which changes rapidly. When the discriminating condition in Step S205 does not hold, that is, the index counters are not "0" through "7", the process advances to Step S209. Here, as for important data of the index counters "16" through "21", control data A/D-converted in the last time is held. When the discriminating condition in Step S205 holds, that is, when the index counters are "0" through "7" (YES) on the other hand, the important data has been broken and the index counter +8-th data is read from the buffer RAM 14 in order to replace the broken data with the recovery data. Next, the process advances to Step S207 to discriminate whether or not the A/D conversion data has been normally completed similarly to the discrimination in Step S203. When the discriminating condition in Step S207 holds, that is, when the data has been determined to be normal A/D conversion data (YES), the process advances to Step S208 to store the A/D conversion data from the buffer RAM 14 to the control RAM 15.

When the discriminating condition in Step S205 does not hold (NO) or the discriminating condition in Step S207 does not hold (NO) after the process in Step S204, the process advances to Step S209 to discriminate whether or not the index counter is "7". When the discriminating condition in Step S209 holds, that is, when the index counter has reached "7", the process advances to Step S210 to add "8" to the index counter and the recovery data whose index counters are "8" through "14" are skipped. When the discriminating condition in Step S209 does not hold, that is, when the index counter has not reached "7" (NO) or the index counter is more than "16" on the other hand, the process in Step S210 is skipped. Next, the process advances to Step S211 to add "1" to the index counter. Next, the process advances to Step S212 to discriminate whether or not the process for storing the A/D conversion data of the index counters up to "21" in the control RAM 15 has been completed. When the discriminating condition in Step S212 does not hold (NO), the process returns to Step S202 to repeatedly execute the same processes described above. Then, when the processes corresponding to all of the index counters end and the discriminating condition in Step S212 holds (YES), this routine ends. The main microcomputer 10 uses those data thus stored to calculate control values (fuel injection quantity, spark ignition timing and the like) for the engine control in the known manner.

Figure 8:
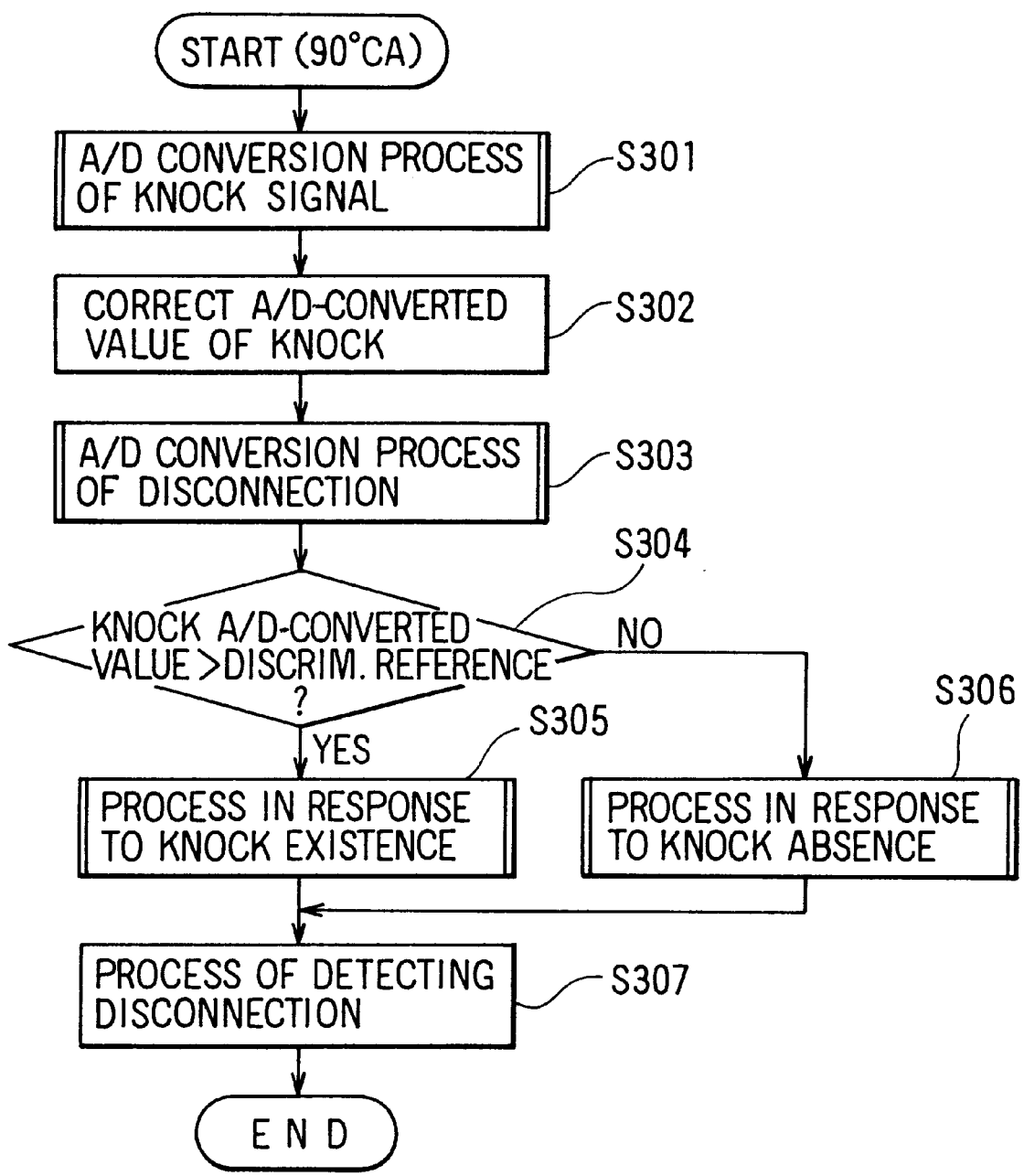
FIG. 8 is a flowchart showing a computer processing of A/D conversion and knock discrimination to a knock signal in the control section of the sub-microcomputer used in the embodiment of the present invention.

The sub-microcomputer 20 is programmed to execute processing of the A/D conversion on the knock signal and of the knock discrimination in the control section 23 as shown in FIG. 8. It is noted that the A/D conversion on the knock signal and knock discriminating routine is repeatedly executed in the control section 23 of the sub-microcomputer 20 per every ATDC 90° CA of the internal combustion engine, that is, time-asynchronously.

At first, in Step S301, as the A/D conversion process on the knock signal from the knock sensor (not shown), A/D conversion for obtaining an A/D-converted value of a peak hold signal obtained by a peak hold circuit (not shown) shown at first at the knock signal A/D conversion timing (▽) in FIG. 2 is executed. Next, the process advances to Step S302 to correct such that the A/D-converted value of the knock signal (knock A/D-converted value) in Step S301 becomes a difference with a signal (background noise signal) caused by normal engine vibration other than knock vibration. Then, the process advances to Step S303 to execute A/D conversion for obtaining an A/D-converted value of an integration signal provided by the second integration circuit (not shown) at the knock signal A/D conversion timing (▽) in FIG. 2. Next, the process advances to Step S304 to discriminate whether or not the knock A/D-converted value corrected in Step S302 exceeds a discrimination reference for discriminating the knock.

When the discriminating condition in Step S304 holds, that is, when the knock A/D-converted value exceeds the discrimination reference (YES), the process advances to Step S305 to transmit its content to the main microcomputer 10 as a process when there is a knock. Thereby, the main microcomputer 10 executes a process for retarding the spark ignition timing in the known manner. When the discriminating condition in Step S304 does not hold, that is, when the knock A/D-converted value is less than the discrimination reference (NO) on the other hand, the process advances to Step S306 to transmit its content to the main microcomputer 10 as a process when there is no knock. Thereby, the main microcomputer 10 executes a process for advancing the spark ignition timing. After the process in Step S305 or in Step S306, the process advances to Step S307 to execute a sensor disconnection detecting and discriminating process based on that whether or not the A/D-converted value on which the A/D conversion has been implemented in Step S303 is within a predetermined range. Then, this routine ends.

As described above, the control system of the present embodiment comprises the main microcomputer 10 which executes the operation for controlling the vehicle in accordance with the program stored inside and which outputs a request signal requesting A/D conversion of a plurality of sensor signals per every constant time to obtain a plurality of A/D conversion data to be used in the operation and the sub-microcomputer 20 which is provided with the A/D converter 21 for A/D-converting the sensor signals and which A/D-converts the plurality of sensor signals based on the request signal from the main microcomputer 10 to transmit the A/D conversion data to the main microcomputer 10 and executes A/D conversion of a predetermined sensor signal in accordance with the program stored inside prior to the A/D conversion based on the request signal from the main microcomputer 10. The A/D conversion request signal from the main microcomputer 10 is a signal for continuously A/D-converting the plurality of predetermined sensor signals in a specified order. Specific sensor signals among the plurality of sensor signals A/D-converted due to this request signal are A/D-converted a plurality of times at predetermined time intervals. The predetermined time interval is set such that it is longer than the time required for the A/D conversion as requested by the request signal of the sub-microcomputer 20 which is asynchronous to the request signal of the main microcomputer 10.

That is, the sensor signals detected by the plurality of sensors are A/D-converted by the A/D converter 21 of the sub-microcomputer 20 as requested by the A/D conversion request signal from the main microcomputer 10. At this time, the specific sensor signals among the plurality of sensor signals are A/D-converted a plurality of times with a time interval longer than the time required for the A/D conversion requested by the request signal of the sub-microcomputer 20 which is asynchronous to the request signal of the main microcomputer 10 by one time of the request signal. Because the A/D conversion requested by the request signal of the sub-microcomputer 20 precedes the A/D conversion requested by the request signal of the main microcomputer 10, the A/D converter 21 A/D-converts the sensor signals based on the request signal of the sub-microcomputer 20 when the request signal of the sub-microcomputer 20 is input to the A/D converter 21 during when it is performing the A/D conversion requested by the request signal of the main microcomputer 10. At this time, although the A/D conversion data of the A/D-converted sensor signals requested by the main microcomputer 10 will be broken, A/D conversion data of the requested and A/D-converted sensor signal may be obtained as for the specific sensor signals because those are A/D-converted a plurality of times with the time interval longer than the time required for the A/D conversion requested by the request signal of the sub-microcomputer 20. It is noted that preferably, the sensor signals which are A/D-converted a plurality of times here are sensor signals which varies rapidly.

Further, according to the present embodiment, when the A/D conversion data which has been A/D-converted in an early stage of the specific sensor signals to be A/D-converted a plurality of times among the sensor signals A/D-converted by one request signal by the A/D converter 21 of the sub-microcomputer 20 is broken, the main microcomputer 10 uses the A/D conversion data which is A/D-converted in and after the next time for the operation. Accordingly, when the A/D conversion data A/D-converted in the early stage among the A/D conversion data A/D-converted a plurality of times by the A/D converter 21 of the sub-microcomputer 20 as requested by one request signal from the main microcomputer 10 is broken, the A/D conversion data A/D-converted in and after the next time may be provided. Therefore, the A/D conversion data not broken at this time may be used for the operation without waiting A/D conversion data A/D-converted by the A/D converter 21 of the sub-microcomputer 20 to be input based on the next request signal of the main microcomputer 10. When the sensor signal which are subjected to calculation of a variation per every constant time is set as the signal to be A/D-converted a plurality of times in particular, the control accuracy may be improved because the A/D conversion data which has been A/D-converted by one request signal may be obtained more reliably.

Further, according to the present embodiment, the main microcomputer 10 uses the A/D conversion data which has been A/D-converted in the previous request signal for the operation when the A/D conversion data A/D-converted just by one time by the A/D converter 21 of the sub-microcomputer 20 is broken. Accordingly, because the A/D conversion data A/D-converted based on the previous request signal from the main microcomputer 10 is used when the A/D conversion data A/D-converted just by one time by the A/D converter 21 of the sub-microcomputer 20 is broken, a time required for the A/D conversion by one time of request signal from the main microcomputer 10 may be suppressed. It is noted that preferably, the sensor signal which is A/D-converted just by one time is the sensor signal which corresponds to a parameter changing slowly with respect to time.

Further, although the sub-microcomputer A/D-converts per predetermined crank angle in accordance with its own program prior to the A/D conversion request of every constant time of the main microcomputer in the embodiment described above, it may A/D-convert not only per predetermined crank angle but also per predetermined time interval as long as the former has a priority over the latter.

Still more, although a data group to be A/D-converted just by one time is A/D-converted after A/D-converting a data group to be A/D-converted a plurality of times, the present invention is not confined that. That is, it will do if the timing for A/D-converting the plurality of times is separated more than the time required for the A/D conversion of the sub-microcomputer and an A/D conversion of the second time of a thermal type AFM (air flow meter) corresponding to the index counter 0 shown in FIG. 4 may be performed at the timing of the index counter 3. It is also possible to schedule so as to A/D-convert a data group to be A/D-converted just by one time between the A/D conversion timing of the first time of the data group to be A/D-converted a plurality of times and the A/D conversion timing of the second time or to schedule at random.

Further, although there are the data group to be A/D-converted just by one time and the data group to be A/D-converted a plurality of times in the present embodiment, all data may be A/D-converted a plurality of times if the time required for the A/D conversion is not considered. Still more, although the same data is A/D-converted twice in the present embodiment, it is possible to A/D-convert by three times, four times or more corresponding to a degree of importance for example.

It is noted that although the present invention has been applied to the control for the internal combustion engine in the preferred embodiment, the present invention is not confined only to that and is applicable also to other vehicle controls such as an anti-lock braking (ABS), a cruise control (C/C) and the like.

We claim:

1. A vehicle electronic control system, comprising:

a main microcomputer which executes a calculation operation for controlling a vehicle in accordance with a program stored inside and which outputs a request signal requesting a time-synchronous A/D conversion of a plurality of sensor signals per every constant time to obtain a plurality of A/D-converted to be used for the calculation operation; and a sub-microcomputer which is provided with an A/D converter for A/D-converting the sensor signals and which A/D-converts the plurality of sensor signals based on the request signal from the main microcomputer to transmit the A/D-converted data to the main microcomputer, and executes a time-asynchronous A/D conversion of a predetermined sensor signal in accordance with a program stored inside with priority over the A/D conversion based on the request signal from the main microcomputer, wherein the A/D converter continuously A/D-converts, in response to each A/D conversion request signal from the main microcomputer, the plurality of predetermined sensor signals in a specified order, and A/D-converts, a plurality of times at a predetermined time interval, specific sensor signals among the plurality of sensor signals, and the predetermined time interval is longer than a time required for the time-asynchronous A/D conversion of the predetermined sensor signal.

2. The control system as in claim 1, wherein the main microcomputer uses, for the calculation operation, a next A/D conversion data of the specific sensor signals resulting after the time-asynchronous A/D conversion, when a previous A/D conversion data of the plurality of sensor signals is broken.

3. The control system as in claim 1, wherein the main microcomputer uses, for the calculation operation, the A/D conversion data resulting in response to a previous request signal from the main microcomputer, when a first one of A/D conversion data resulting in response to a next request signal from the main microcomputer is broken.

4. The control system as in claim 1, wherein the time-asynchronous A/D conversion is requested at every angular rotation of a crankshaft of an engine, and the predetermined signal for the time-asynchronous A/D conversion is a knock signal of the engine.

5. A control method for an engine by a first microcomputer and a second microcomputer including an A/D converter, the control method comprising the steps of:

requesting a time-synchronous A/D conversion from the first microcomputer to the second microcomputer at every constant time interval;

A/D-converting, by the A/D converter, a plurality of sensor signals indicative of detected engine parameters in response to each time-synchronous A/D conversion request from the main microcomputer, the constant time interval being set to enable the A/D converter to execute the time-synchronous A/D conversion a plurality of times thereby providing a plurality of A/D- converted data of the plurality of sensor signals in each of repeated time-synchronous A/D conversions;

requesting a time-asynchronous A/D conversion at every predetermined angular rotation of the engine;

A/D-converting, by the A/D converter, another sensor signal indicative of another detected engine parameter in response to the time-asynchronous A/D conversion request, the time-asynchronous A/D conversion being executed by interrupting the time-synchronous A/D conversion; and using, for calculation operation by the first microcomputer, one of the A/D-converted data of the plurality of sensor signals which is not interrupted by the time-asynchronous A/D conversion.

6. The control method as in claim 5, wherein the plurality of sensor signals correspond to a first group of engine parameters and a second group of engine parameters which change slowly than the first group of engine parameters, the time-synchronous A/D conversion is executed repeatedly only on the first group of engine parameters in response to the each time-synchronous A/D conversion request, and the another sensor signal corresponds to an engine knock.

* * * * *